United States Patent [19]
Leavens

[11] Patent Number: 5,778,557
[45] Date of Patent: Jul. 14, 1998

[54] TEMPERATURE AND ATMOSPHERE CONTROL SYSTEM FOR STORED PRODUCTS

[75] Inventor: Roland B. Leavens, Selah, Wash.

[73] Assignee: Food Plant Engineering, Inc., Yakima, Wash.

[21] Appl. No.: 950,268

[22] Filed: Sep. 23, 1992

[51] Int. Cl.$^6$ .............................. F26B 19/00; F25D 17/04
[52] U.S. Cl. .............................. 34/222; 34/231; 62/408; 9/474; 454/173
[58] Field of Search .............................. 34/34, 231, 229, 34/222, 212, 219; 62/408, 414, 417; 99/474; 432/152; 454/173

[56] References Cited

U.S. PATENT DOCUMENTS

| | | | |
|---|---|---|---|
| 1,736,788 | 11/1929 | Huston | 454/100 X |
| 1,939,957 | 12/1933 | Day | 454/100 X |
| 2,050,226 | 8/1936 | Krick | 34/34 X |
| 2,079,304 | 5/1937 | Polderman | 99/154 |
| 2,279,847 | 4/1942 | Stebbins | 62/406 Y |
| 2,718,713 | 9/1955 | Bloxham | 34/231 X |
| 3,008,838 | 11/1961 | Brunsing et al. | 99/193 |
| 3,090,130 | 5/1963 | Smith | 34/34 |
| 3,123,988 | 3/1964 | Richmam | 62/418 |
| 3,129,071 | 4/1964 | Meredith | 34/34 |
| 3,604,218 | 9/1971 | Cresti | 62/408 |
| 4,354,549 | 10/1982 | Smith | 165/62 |
| 4,426,923 | 1/1984 | Ohata | 94/468 |
| 4,566,377 | 1/1986 | van Buytene | 99/474 |
| 4,676,152 | 6/1987 | Tsuji et al. | 99/468 |
| 4,824,685 | 4/1989 | Bianco | 426/418 |
| 4,941,823 | 7/1990 | Ross | 432/144 X |
| 4,955,146 | 9/1990 | Bollinger | 34/191 |

OTHER PUBLICATIONS

FIG. 2 of Auto–Ripe Reference with added numerals Jul. 9, 1992.

Thermal Technologies, Inc. brochure entitled "Auto–Ripe Owner–Friendly Pressurized Ripening Systems," by Thermal Technologies, Inc., 1256 N. Providence Rd., Suite 2, Media, PA, 19063; published prior to application filing date.

Food Plant Engineering, Inc. Drawing A–15.6; dated Sep. 21, 1990.

Blueprint: Date Packing Consolidation To Thermal Plant Dole Dried Fruit & Nut Co., Food Plant Engineering, Inc., Job No. 8836, dated Mar. 22, 1989, Sheet M–4A.

*Primary Examiner*—William E. Wayner
*Attorney, Agent, or Firm*—Klarquist Sparkman Campbell Leigh & Whinston

[57] ABSTRACT

The control system includes a sealed chamber for storing products such as food products in a desired condition until scheduled for delivery. The conditions may be cooling, freezing, heating, dehydrating, rehydrating, etc., of fruit, bakery products, meat, or other products requiring rapid and controlled changes in temperature, humidity, or gases to preserve them. Alignment structure within the chamber floor spaces rows of product such as supported pallets apart from the sidewalls to define high and low pressure plenums. A sealing member extends from the chamber ceiling to one side of each row to form a seal therewith. The sealing member and palletized product, along with other seals within the chamber, divide the chamber into multiple volumes. One or more movable sealing baffles may be constructed for selectively forming a seal between a sidewall and the palletized product for a partially filled chamber. A fluid control unit injects gases of a selected type or temperature into the one volume and withdraws the fluid from the another volume to cause fluid to flow through the palletized product. To increase floor space and allow maintenance with food product in the chamber, the fluid control unit may be mounted outside the chamber interior. The system may be used with multiple row, multiple tier chambers. By placing the sealing members in selected positions relative to the rows of palletized product, a number of different fluid flow patterns through the food product may be achieved.

39 Claims, 5 Drawing Sheets

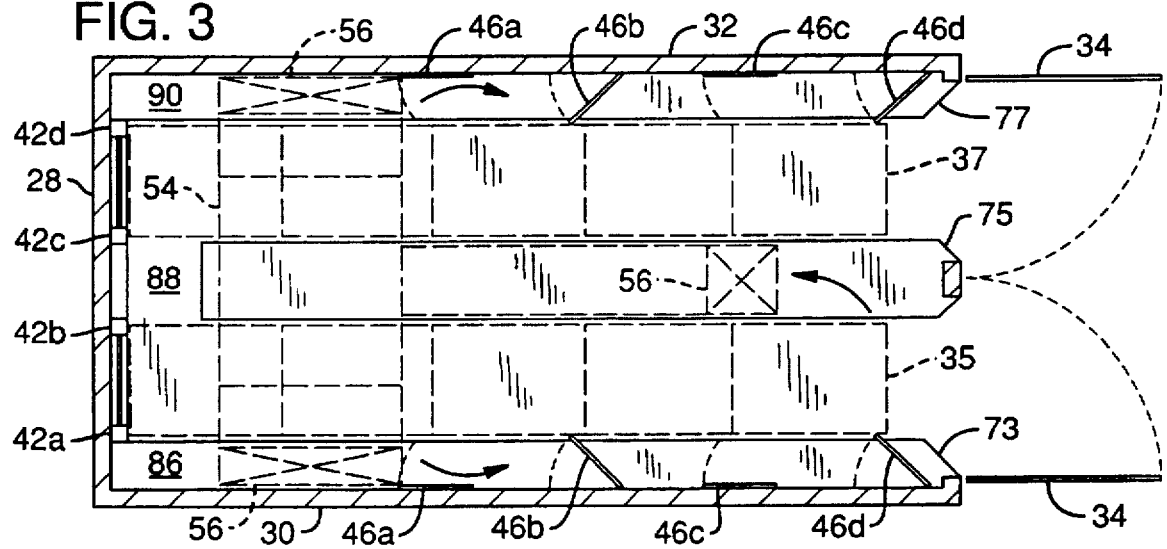
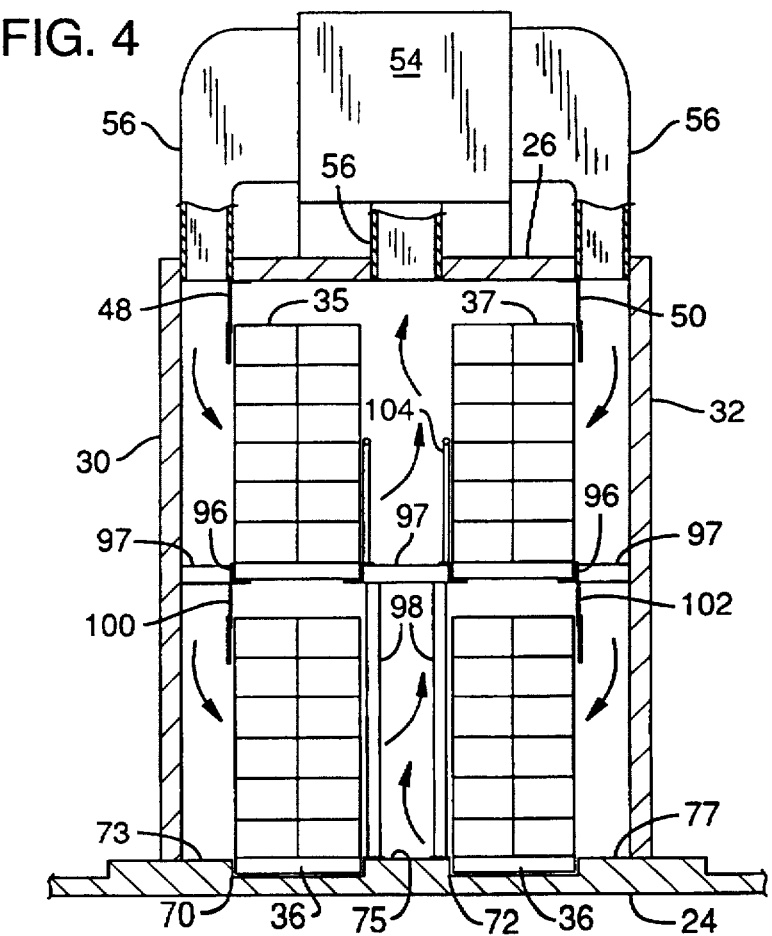

TEMPERATURE AND ATMOSPHERE CONTROL SYSTEM FOR STORED PRODUCTS

BACKGROUND OF THE INVENTION

This invention relates generally to method and apparatus for controlling the warming, cooling, freezing, dehydration, rehydration or other conditions of stored products such as fruits, vegetables, dairy products, bakery goods and meats or non-food products as well. More particularly, this invention relates to a novel temperature and atmosphere control system that is more effective, requires less space and less labor to operate than conventional food storage systems and also operates effectively even with partial loads of products.

Food products and other products often require rapid and controlled changes in temperature, humidity, or gases to preserve them. To provide for such changes, they are often stored in a special environment for a length of time before they are distributed for sale. For example, bananas and other fresh fruit are stored in special ripening rooms that include an air conditioning unit which controls the temperature and atmosphere composition within the room. Through such control, the fruit can be ripened as it is scheduled for delivery to grocery stores, restaurants and the like. Similarly, other special environments are provided for degreening, refrigerating, freezing, dehydrating, fumigating and otherwise treating stored food products.

These environments are typically sealed chambers that include a temperature and atmosphere control system for passing a fluid such as air around and through containers of the food product. The product containers are designed with openings therein to allow the air to pass through the container. The containers are also designed to stack on one another to form units that each can be set on a pallet or equivalent structure for ease of transport. A load of palletized product made up of a number of pallet units can be stored in the chamber, the amount of product depending on the chamber's dimensions.

Although prior systems work adequately, they have a number of drawbacks that increase their cost and limit their versatility. One drawback for many prior systems is the need for a tarp arrangement to create sufficient seals within the chamber. As illustrated in U.S. Pat. No. 4,824,685, for example, tarps must be placed on various sides of the palletized produce to force the air through the pallet containers. These tarps must either be moved into place with a cable and pulley system or be manually draped over the produce. In either case, the tarps require equipment and labor to move the food product into and out of the chamber.

Another drawback is the limited ways in which gases can be passed through the pallet containers. Prior systems that can accept two rows or lanes of palletized product are designed to define a low pressure plenum between the rows sealed from a high pressure plenum surrounding the palletized product. An air handling unit withdraws air from the low pressure plenum while injecting air into the high pressure plenum. This creates a difference in pressure between the two air volumes and causes the air in the high pressure plenum to flow through the openings in the pallet containers into the low pressure plenum. However, passing the air in other directions through the pallet containers is not possible. For example, air cannot be injected into the volume of the low pressure plenum and withdrawn from the volume of the high pressure plenum because the tarps would be blown off the palletized product. Nor can the air be injected on the outer side of one row of palletized product, pass through both rows and be withdrawn from the outer side of the other row. These other flow patterns may be advantageous for conditions such as ripening, freezing, dehydrating, etc. of different types of food products.

SUMMARY OF THE INVENTION

An object of the invention, therefore, is to provide an improved temperature and atmosphere control system that overcomes the drawbacks of prior systems described above.

Another object of the invention is to provide such a system that forms seals required within the chamber simply by loading the product into place.

Yet another object of the invention is to provide such a system that allows for different fluid flow patterns through the product as desired.

Yet another object of the invention is to provide such a system that works effectively with a partial load of product stored within the chamber.

Several preferred embodiments of the invention are described and shown herein. An apparatus according to the invention may include a chamber having a volume defined by a floor, ceiling and sidewalls. Alignment structure is set within the chamber for spacing a first row of product, such as palletized food product, apart from the sidewalls. A sealing member may extend from the chamber ceiling to one side of the row of product to form a seal therewith. The sealing member and product divide the chamber into a first volume on one side of the product and a second volume on another side of the product. A fluid control unit such as an air conditioner injects fluid such as gases of a selected type or temperature into the first volume and withdraws the fluid from the second volume. This action creates a difference in pressure between the volumes which causes the gases to flow through the product.

The apparatus may also include one or more movable sealing baffles constructed for selectively forming a seal between a sidewall and the product. The baffles allow the system to work effectively even if the product only partially fills the chamber.

The alignment structure may be constructed as a path defined within the ceiling floor. The path aligns the product relative to the sidewalls and forms a seal between pallets that may support the product and the chamber floor.

To increase floor space and allow maintenance with product in the chamber, the apparatus may be designed so that the fluid control unit is mounted outside the chamber interior.

The invention is not limited to apparatus designed single row, single tier apparatus. The alignment structure may accommodate several rows of product. And a frame structure may be placed within the chamber to support multiple tiers of product per row. By placing the sealing member in select positions relative to the rows of product, a number of different fluid flow patterns through the food product may be achieved.

The foregoing and other objects, features, and advantages of the invention will become more apparent from the following detailed description of several preferred embodiments which proceeds with reference to the accompanying drawings.

BRIEF DESCRIPTION OF THE DRAWINGS

FIG. 3 is a top view of the system embodiment showing the operation of the sealing baffles and the various volumes defined within the chamber.

FIG. 4 is an end view of a multiple tier embodiment of the system.

DETAILED DESCRIPTION OF SEVERAL PREFERRED EMBODIMENTS

Basic Embodiments

Figure 1:
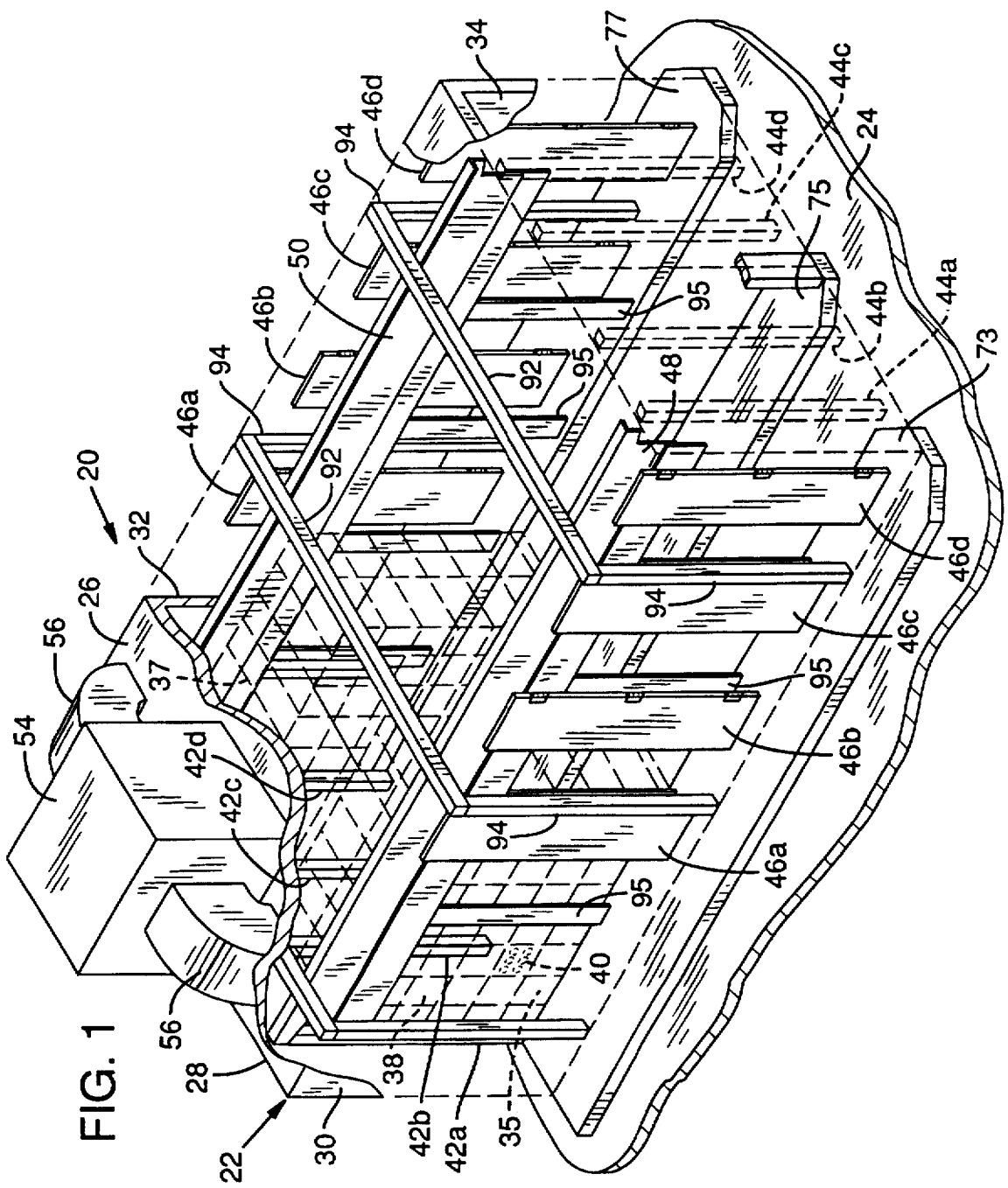
FIG. 1 is a perspective view of a one embodiment of a control system according to the invention with parts of the chamber sidewalls broken away to show the elements of the system.

Referring now generally to FIGS. 1-3 and initially to FIG. 1, there is shown a control system according to the invention generally indicated by the reference numeral 20. The system includes a chamber 22 having a volume defined by a floor 24, ceiling 26, rear wall 28, sidewalls 30 and 32 and door 34. The door may be a hinged panel, removable panel, vertical or horizontal sliding panel. These elements of the chamber 22 are gas tight against leakage from the chamber when the door 34 is closed and may be insulated. The length and width of the chamber 22 are a matter of design choice, depending on the desired capacity (which affects the number of rows and tiers per row of palletized food product). The height of the chamber 22 is preferably no more that 12" to 16" above the top of the palletized product. The present invention is applicable to chambers with single or multiple rows and single or multiple tiers per row.

The chamber 22 is designed to accept a load of product such as palletized food product that includes a number of pallet units placed in rows 35 and 37, also referred to as lanes. Each pallet unit in turn comprises a pallet 36 on which are stacked food product containers 38. Pallets 36 are of a standard size used in the food industry. Alternatively, product may simply be stacked within the chamber 22 without being supported on pallets. Product containers 38 may vary in size, though preferably containers 38 of the same size are used on each pallet 36 so that openings 40 defined in the sides of the containers are aligned with each other when the containers are stacked on the pallet. These openings 40 allow air to flow freely and uniformly pass the food product within the product containers 38 for maximum effect. Alternatively, food product such as meat may come in its own packages and not require separate containers. For purposes of this description, however, such packaging is considered equivalent to the containers 38 and is stacked in a similar manner.

The chamber 22 also includes several other elements for making the system 20 operable. A seal is provided in the rear of the chamber by as foam cushion strips 42a–d, rubber gasket or equivalent resilient material on the rear wall 28 and running from the floor 24 to the ceiling 26. A similar seal may be provided in the front of the chamber 22 by foam cushion strips 44a-d on the door 34. Movable barriers such as sealing baffles 46a–d, to be described, are mounted to sidewalls 30 and 32 for sealing against the palletized product in a partially filled chamber. Sealing members 48 and 50 extend downward from the ceiling 26 to one side of rows 35 and 37 of palletized product to form a seal therewith. An alignment structure such as a recessed path or guide rails (best seen in FIGS. 2A–D) is also provided for spacing each row 35 and 37 of palletized food product apart from the sidewalls 30 and 32, respectively, to define the volumes and to block air from bypassing the product by flowing through the pallets.

Circulation of fluid such as air or selected gases through the chamber 22 is controlled by a fluid control unit 54 (or multiple units for a large chamber 22) mounted outside the chamber but preferably on or adjacent to it. By mounting the unit 54 in this manner, it may be serviced without removing food product from the chamber 22. The external mounting also allows the chamber 22 to be smaller in size yet have the same useable volume, resulting in a lower cost of construction and operation. Specifically, the fluid control unit 54 is a conventional device that controls the temperature and composition of fluids such as air circulated within the chamber 22. The unit 54 may be operably connected to the chamber 22 via ducts 56 to inject air into and withdraw air from the various defined volumes within the chamber serving as a high pressure plenum and a low pressure plenum. This action produces a desired flow of air past the food product. As will be described, inlet and outlets of the control unit 54 are located at specific locations in the ceiling 26 to produce the desired flow pattern.

Figure 2A:
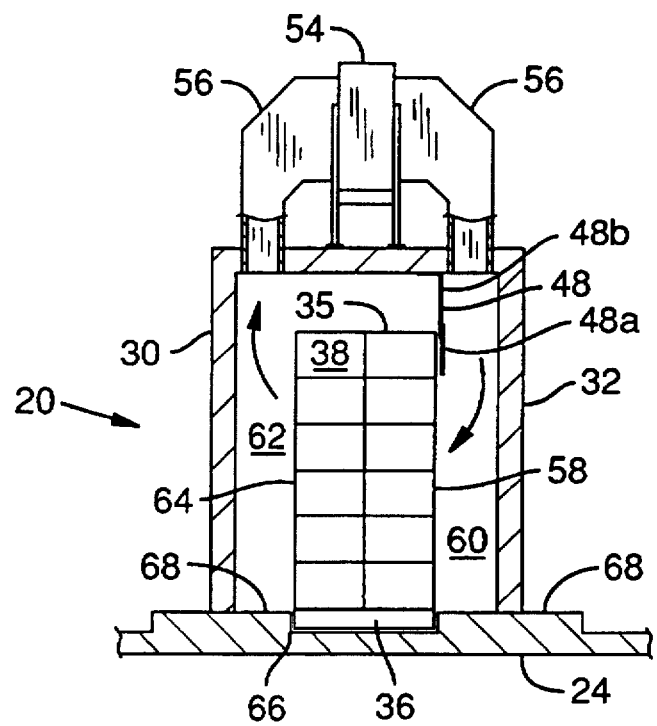
FIGS. 2A-D are front views of the chamber showing therein various arrangements of sealing members and rows of palletized food product therein.

FIGS. 2A–D are front views of the chamber 22 showing therein various arrangements of sealing members 48 and 50 to provide for different fluid flow patterns through the palletized product. FIG. 2A shows a single row embodiment of system 20 in which the sealing member 48 extends from the ceiling 26 to the outer side 58 of the row 35 to form a seal therewith. The sealing member 48 may be a strip 48a of resilient, food-grade material attached to a rigid support 48b. Alternatively, strip 48 may be a unitary piece of material. Whatever the exact construct, strip 48 extends sufficiently downward from the ceiling 26 to overlap the vertical side 58 to form an effective seal when pressed against the side. Sealing member 48 also extends longitudinally across the length of the chamber to cover an entire row 35. It should be understood that row 35 and sealing member 48 need not necessarily be linear, although such a design is preferred. Sealing member 48 may be curved or segmented so long as it is positioned relative to the palletized product in row 35 to form an effective seal therewith. Along with the other seals at the floor, sidewalls and front and rear of the chamber 22, the sealing member 48 divides the chamber volume into a first volume 60 on the side 58 of the palletized product 35 and a second volume 62 on the other side 64 of the product. Volume 60 is a high pressure plenum and volume 62 is a low pressure plenum, as will be described.

The alignment structure within the chamber 22 may take several forms, but preferably includes a path 66 and curbs 68 defining the path within the chamber floor 24, typically concrete or equivalent material such as a metal guide rail. The path 66 automatically aligns the row 35 of palletized product relative to the chamber 22 as the pallets are loaded into the chamber. The curb 68 is of sufficient height above the path 66 to form a seal with a pallet 36 supporting the food product. This seal prevents fluid from circulating underneath the row 35 of food product. Less preferred, although also possible, is alignment structure in the form of the guide rails in place of curbs 68. Such rails would be mounted to the chamber floor 24 in a conventional manner.

The fluid control unit 54 is shown mounted atop the chamber 22 with ducts 56 for injecting fluid of a selected type and temperature by way of a first duct 56 through ceiling 26 into the volume 60 and withdrawing the fluid by way of a second duct 56 through ceiling 26 from the volume 62. In doing so, the unit 54 creates a difference in pressure between the volumes which causes the fluid to flow through the palletized product.

Figure 2B:
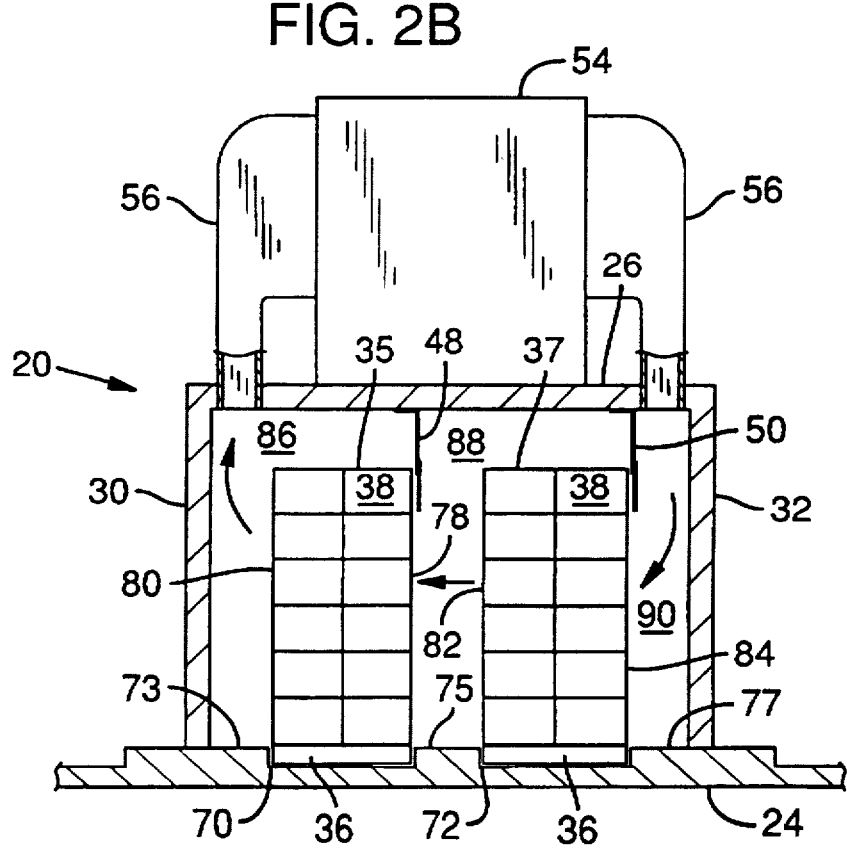

FIG. 2B shows a multiple row embodiment of the system 20 that permits a number of different flow patterns through the product. The alignment structure is constructed as dual paths 70 and 72 to properly align two rows 35 and 37 of palletized product within the chamber 22. For sealing the bottom of the palletized product, curbs 73, 75 and 77 are provided on both sides of both paths. The rows 35 and 37 are spaced apart from each other and from the sidewalls 30 and 32. Row 35 has an inner side 78 adjacent to row 37 and an outer side 80 adjacent to sidewall 30. Row 37 has an inner side 82 adjacent to row 35 and an outer side 84 adjacent to sidewall 32. Sealing members 48 and 50 extend from the chamber ceiling 26 to each form a seal with a side of palletized product. The sealing members 48 and 50, along with the rows 35 and 37 and other seals described herein divide the chamber into multiple volumes 86, 88 and 90.

In FIG. 2B, sealing member 48 is positioned to form a seal with the inner side 78 of row 35 and the sealing member 50 is positioned to form a seal with the outer side 84 of row 37. Seals at the sidewalls, floor, rear and the front of the chamber are achieved as described before. The fluid control unit 54 is mounted atop chamber 22 and is constructed to inject fluid by way of a first duct 56 through ceiling 26 into a high pressure volume 90 and to withdraw fluid by way of a second duct 56 through ceiling 26 from a low pressure volume 86, thereby creating a difference in pressure across rows 35 and 37. As indicated by the arrows, the injected fluid flows through the product containers 38 in row 37, into the intermediate volume 88, through the product containers 38 in row 35, into the low pressure volume 86 and back through the second duct 56 to the control unit 54.

Sealing members 48 and 50 may be movably mounted to the chamber ceiling 26 for reconfiguring the flow patterns through the chamber 22 and to accommodate product of different widths. However, unlike prior tarp arrangements, the sealing members need not be moved for sealing product each time product is loaded into the chamber. In use, the sealing members simply hang in position and automatically form the required seal as they are pressed against a side of the palletized product by gas in a higher pressure volume.

Figure 2C:
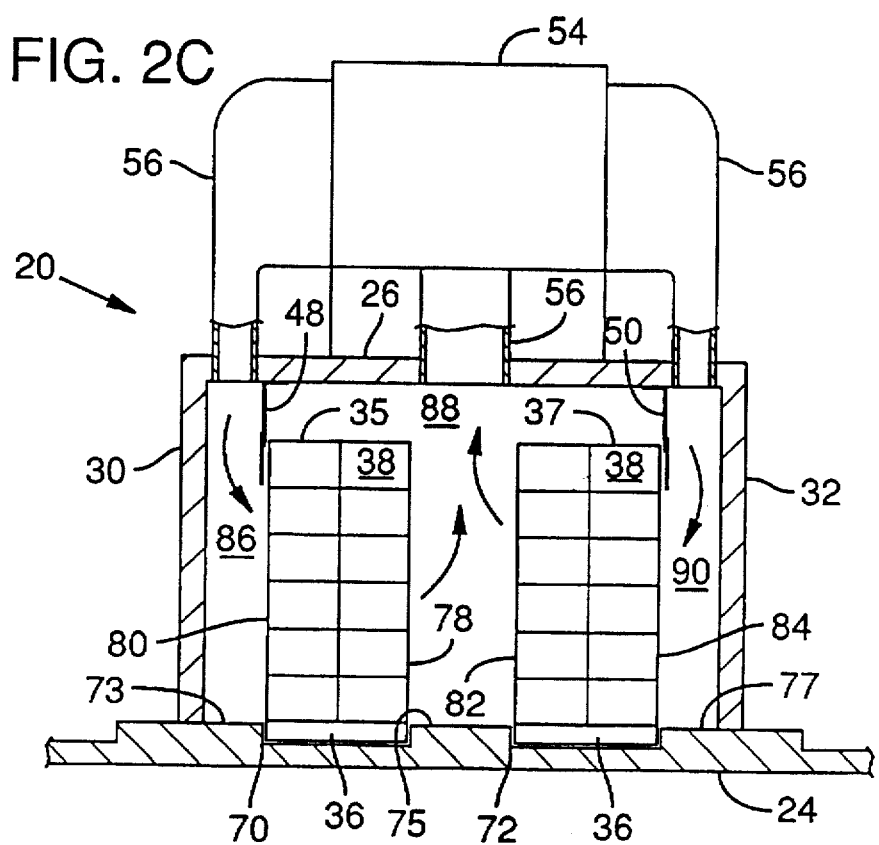

FIG. 2C shows another embodiment of system 20 that achieves a different fluid flow pattern. Sealing member 48 is positioned to form a seal with the outer side 80 of row 35 and sealing member 50 is positioned to form a seal with the outer side 84 or row 37. As indicated by the arrows, the fluid control unit 54 in this embodiment is constructed to inject fluid by way of first and second ducts 56 through ceiling 26 into high pressure volumes 86 and 90 and to withdraw fluid by way of a third duct 56 through ceiling 26 from intermediate, low pressure volume 88. The flow of fluid is therefore inward, left to right across row 35 and right to left across row 37.

Figure 2D:
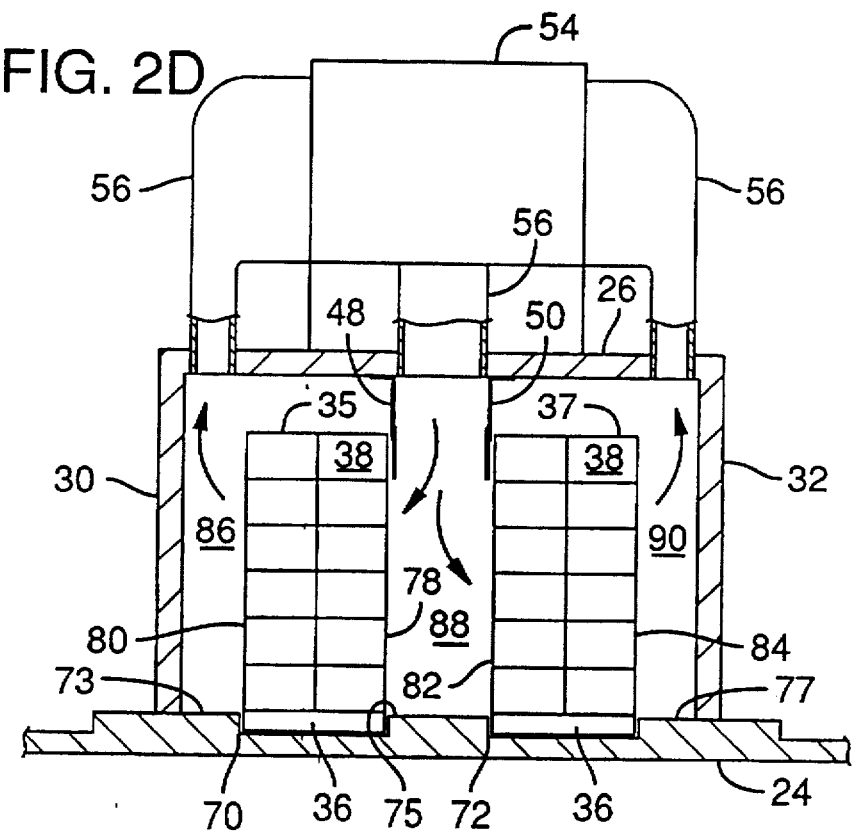

In the system embodiment of FIG. 2D, sealing member 48 is positioned to form a seal with the inner side 78 of row 35 and sealing member 50 is positioned to form a seal with the inner side 82 of row 37. As indicated by the arrows, the control unit 54 is constructed to inject fluid by way of the third duct 56 through ceiling 26 into an intermediate, high pressure volume 88 and to withdraw fluid by way of first and second ducts 56 from low pressure volumes 86 and 90. The flow of fluid is therefore outward, right to left across row 35 and left to right across row 37.

Referring now to FIGS. 1 and 3, baffles 46a–d are affixed to the structure of the chamber 22. They are constructed for selectively forming a seal between a sidewall and the palletized product for defining reduced volumes 86 and 90 (FIGS. 2B–D) or volumes 60 and 62 (FIG. 2A) when the chamber is partially filled with product. In the preferred embodiment the baffles are rectangular panels made of a durable, resilient material that extend from the floor 24 to the ceiling 26. They are hinged to sidewalls 30 and 32 and may include rubber seals along their edges. Each baffle 46 may be independently closed either manually or by automatic means to create a seal with a partial load of palletized product. Baffle 46d is optionally used for full loads in place of a front cushion 44 or equivalent seal on door 34 pressing against the end of a row of the palletized product. In another form, each baffle 46 can be constructed as an array of gates that are turned in one direction to be let fluid pass through and in another direction to form a seal.

These baffles 46a–d in the preferred embodiment are movably mounted to a sidewall. The baffles are movable between a retracted position in which they rest against a sidewall and a sealing position in which they are sealed against a row of the palletized product. How the baffles are set depends on the length of the palletized product row. The baffle adjacent to the end of A row is pivoted into the sealing position to prevent fluid from circulating around and behind the food product rather than through the product containers 38. If only a partial row is loaded into chamber 22, for example, then one of the intermediate baffles 46a–c is moved against the end of the row to create a seal. A baffle 46d may even be used with a complete row 35 in place of a tarp or a front cushion 44 on the door 34.

FIG. 1 also shows a preferred construction of sealing members 48 and 50. Each is fastened to the ceiling 26 or to cross beams 92 of an internal frame structure and extends outward to overlap a side of a row of palletized product. As described, sealing member 48 or 50 is preferably a continuous piece of material that seals against palletized product. If the pallet units within rows 35 or 37 are not of equal width, the sealing member should have enough "give" that it can accommodate such a size difference. Also included within the chamber 22 are optional strip seals 95 for forming a vertical seal between adjacent pallet units. Strip seals 95 are wide enough and long enough to cover any gap between pallet units, and may be made of a material similar to that used in sealing members 48 and 50.

Multi-tier Embodiments

Figure 5:
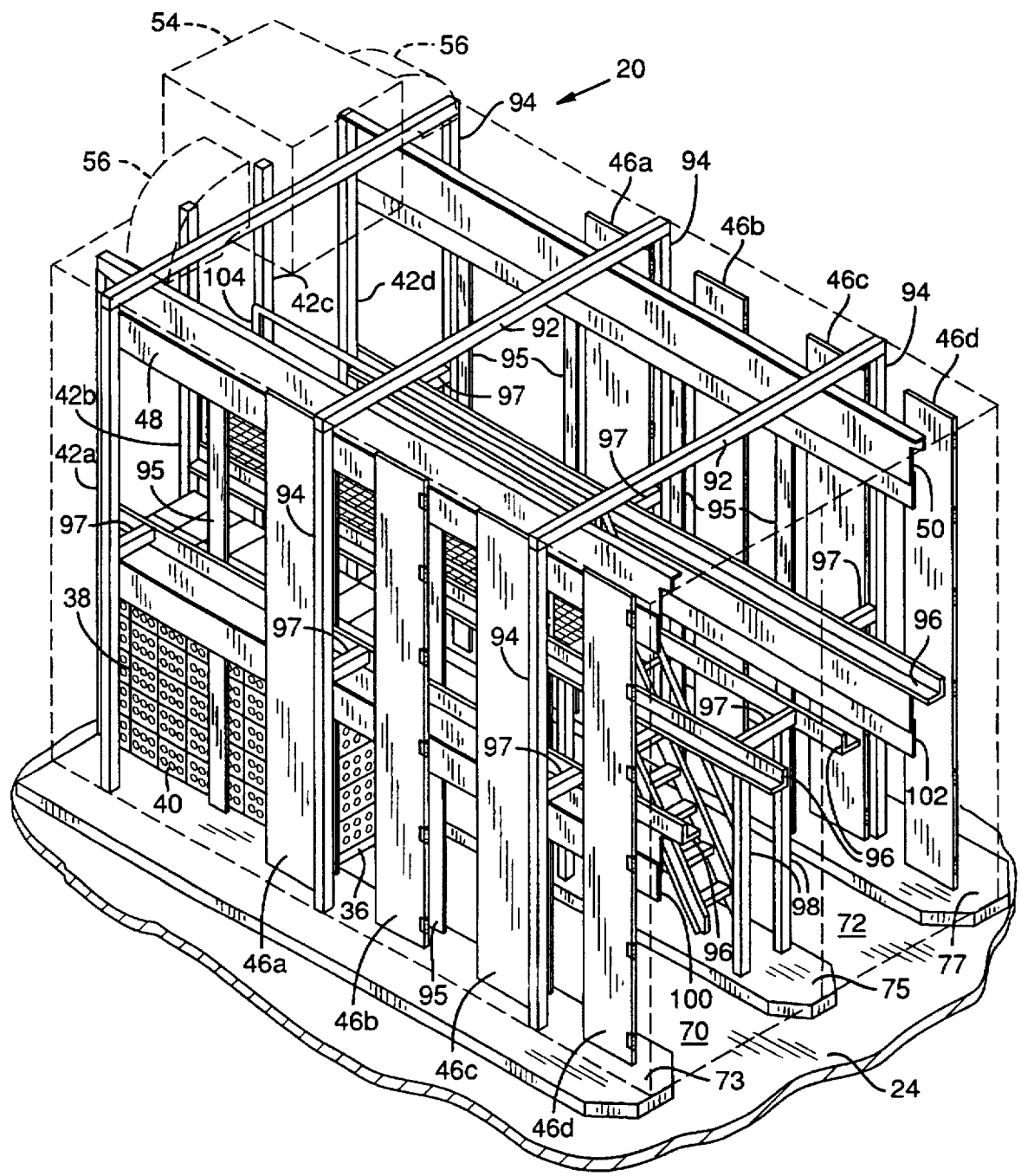
FIG. 5 is a perspective view of the multiple tier embodiment showing a preferred construction of the internal frame structure, sealing members, and sealing baffles.

The invention is not limited to single-tier loads of palletized product. FIGS. 4 and 5 illustrate a multiple, vertical tier embodiment of the system 20. To support a second, third or additional tiers of palletized product above the first tier, the chamber 22 includes guide members such as rails 96 attached to beams 97. Beams 97, in turn, are supported by vertical struts 94 which are embedded within walls 30 and 32 and are mounted on center curb 75. Pallets 36 may be pushed or rolled onto the guide rails 96 or equivalent push-back racks by conventional methods. Guide rails 96 also form a seal with the pallets in the upper tier in a manner similar to the curbs 73, 75, 77 on the chamber floor 24. An additional set of sealing members 100, 102 extend from the guide rails 96 to form seals with sides of the first tier of palletized product. For observing the condition of food product on upper-tier pallets, an observation platform 104 may be installed between rows 35 and 37 of palletized product. In operation, multiple tier system embodiments work generally in the same manner as the single-tier embodiments already described in FIGS. 2A–D.

In view of these and the wide variety of other embodiments to which the principles of the invention can be applied, the illustrated embodiments should be considered exemplary only and not as a limitation on the meaning of the following claims.

Having described and illustrated the principles of the invention with reference to several preferred embodiments, it is apparent that such embodiments can be modified without departing from such principles. For example, the product may be mounted on supports other than pallets or stored without pallets within the chamber 22. The product may be food or a non-food product. The product may be housed in containers or simply be in packages. We therefore claim as the invention all such modifications as may come within the scope and spirit of the following claims.

We claim:

1. Apparatus for controlling temperature or atmospheric effects on stored product, comprising:
    a chamber having a volume defined by a floor, ceiling and sidewalls;
    alignment structure within the chamber for spacing stored product apart from the sidewalls, the stored product having a height;
    a flexible sealing member overlapping one side of the stored product to form a seal therewith, the sealing member and the stored product dividing the chamber volume into a first volume on one side of the product and a second volume on another side of the product;
    one or more parallel, movable sealing baffles operatively connected to the chamber and extending along the height of the stored product for forming a seal between a sidewall and the product along the height of the product; and
    a fluid control unit operably connected to the chamber for injecting fluid of a selected type or temperature into one of the first and second volumes and withdrawing the fluid from the other of the first and second volumes, the unit thereby creating a difference in pressure between the volumes which causes the fluid to flow through the product, the control unit and sealing member arranged within the chamber to prevent the fluid that is withdrawn from one volume from directly entering the other volume.

2. The apparatus of claim 1 wherein the alignment structure comprises a curb defined within the floor of the chamber for aligning the product relative to the chamber and for forming a seal with a pallet supporting the product.

3. The apparatus of claim 1 wherein the product is mounted on pallets to form palletized product.

4. The apparatus of claim 3 wherein the sealing baffle is movably mounted to a sidewall.

5. The apparatus of claim 1 wherein the fluid control unit is mounted external to the chamber.

6. The apparatus of claim 1 wherein the sealing member comprises a sealing strip extending sufficiently from the chamber ceiling to overlap a side of the product and extending longitudinally across the chamber.

7. The apparatus of claim 1 wherein:
    the alignment structure is constructed to align at least two rows of product within the chamber, the two rows being spaced apart from each other and from the sidewalls and having an inner side adjacent to another row and an outer side adjacent to a chamber sidewall; and
    at least two sealing members extending from the chamber ceiling to each form a seal with one side of a row of product, the sealing members and rows dividing the chamber volume into multiple volumes.

8. The apparatus of claim 7 wherein each sealing member is positioned to form a seal with an inner side of a row.

9. The apparatus of claim 7 wherein one sealing member is positioned to form a seal with the inner side of one row and the other sealing member is positioned to form a seal with the outer side of another row.

10. The apparatus of claim 7 wherein each sealing member is positioned to form a seal with the outer side of a row.

11. The apparatus of claim 7 wherein the fluid control unit is constructed to inject fluid into first and third volumes defined between the sidewalls and rows and to withdraw fluid from a second volume defined between the two rows.

12. The apparatus of claim 7 wherein the fluid control unit is constructed to inject fluid into a second chamber volume defined between the two rows and to withdraw fluid from first and third volumes defined between the sidewalls and rows.

13. The apparatus of claim 7 wherein the fluid control unit is constructed to inject fluid into a first chamber volume defined between a sidewall and a row and to withdraw fluid from a third chamber volume defined between the opposite sidewall and another row, the unit thereby creating a difference in pressure across the rows of palletized products.

14. The apparatus of claim 1 including:
    a frame structure for supporting at least a second tier of product above a first tier of product;
    a guide member attached to the frame structure for spacing the second tier of product apart from the sidewalls; and
    a second sealing member extending from the guide member to form a seal with one side of the first tier of product.

15. The apparatus of claim 1 including an observation platform adjacent to one side of the row of product.

16. The apparatus of claim 1 wherein the movable sealing baffle forms a substantially complete seal to control fluid flow through the chamber.

17. Apparatus for controlling temperature or atmospheric effects on stored product, comprising:
    a chamber having a volume defined by a floor, ceiling and sidewalls;
    alignment structure within the chamber for spacing stored product apart from the sidewalls, the stored product having a height;
    one or more parallel, movable sealing baffles each extending along the height of the stored product and pivotally mounted to each sidewall for movement between a retracted position in which the baffle rests against the sidewall and a sealing position in which the baffle is sealed against the stored product along the height of the stored product; and
    a fluid control unit operably connected to the chamber for circulating fluid through the stored product by injecting fluid of a selected type or temperature at one side of the stored product between the baffle and product and for withdrawing the fluid from another side of the stored product.

18. The apparatus of claim 16 wherein the product is mounted on pallets to form palletized product.

19. Apparatus for controlling temperature or atmospheric effects on stored product, comprising:
    a chamber defined by a floor, ceiling and sidewalls;
    alignment structure within the chamber for spacing stored product apart from the sidewalls, the stored product having a height;
    a flexible sealing member for dividing the chamber into a first volume between the stored product and a sidewall and a second volume outside the first volume;
    one or more parallel, movable sealing baffles operatively connected to the chamber and extending along the height of the product for forming a seal between the product and the sidewall; and a fluid control unit for injecting fluid of a selected type or temperature into one of the first and second volumes, thereby causing the fluid to flow through the stored product.

20. The apparatus of claim 19 wherein the movable sealing baffle forms a substantially complete seal to control fluid flow through the chamber.

21. The apparatus of claim 19 including:

a frame structure for supporting at least a second tier of product above a first tier of product;

a guide member attached to the frame structure for spacing the second tier of product apart from the sidewalls; and a second sealing member extending from the guide member to form a seal with one side of the first tier of product.

22. The apparatus of claim 19 wherein the fluid control unit is constructed to inject fluid into the first volume and withdraw fluid from the second volume.

23. The apparatus of claim 19 wherein the fluid control unit is constructed to inject fluid into, or withdraw fluid from, a portion of the first volume defined by a sidewall, the stored product and a sealing baffle sealed between the product and the sidewall.

24. The apparatus of claim 19 wherein the sealing member comprises a vertical flexible sealing strip overlapping a side of the stored product.

25. The apparatus of claim 19 wherein the fluid control unit is mounted within the ceiling of the chamber.

26. The apparatus of claim 19 wherein the fluid control unit has an inlet and an outlet integrated into a single unit.

27. The apparatus of claim 19 wherein the sealing baffle is pivotally connected to the chamber.

28. The apparatus of claim 19 wherein:

the alignment structure is constructed to align at least two rows of stored product within the chamber, the two rows being spaced apart from each other and from the sidewalls and having an inner side adjacent to another row and an outer side adjacent to a chamber sidewall; and at least two sealing members each forming a seal with one side of a row of product, the sealing members and rows dividing the chamber volume into multiple volumes.

29. The apparatus of claim 28 wherein each sealing member is positioned to form a seal with an inner side of a row of product.

30. The apparatus of claim 28 wherein one sealing member is positioned to form a seal with the inner side of one row and the other sealing member is positioned to form a seal with the outer side of another row.

31. The apparatus of claim 28 wherein each sealing member is positioned to form a seal with the outer side of a row.

32. The apparatus of claim 28 wherein the fluid control unit is constructed to inject fluid into first and third volumes defined between the sidewalls and rows and to withdraw fluid from a second volume defined between the two rows.

33. The apparatus of claim 28 wherein the fluid control unit is constructed to inject fluid into a second chamber volume defined between the two rows of product and to withdraw fluid from first and third volumes defined between the sidewalls and rows.

34. The apparatus of claim 28 wherein the fluid control unit is constructed to inject fluid into a first chamber volume defined between a sidewall and a row and to withdraw fluid from a third chamber volume defined between the opposite sidewall and another row, the unit thereby creating a difference in pressure across the rows of palletized products.

35. Apparatus for controlling temperature or atmospheric effects on stored product, comprising:

a chamber defined by a floor, ceiling and sidewalls for storing product;

a flexible sealing member adjacent to the stored product for dividing the chamber into a first volume and a second volume;

a movable sealing baffle operatively connected to the chamber and extending the height of the product for controlling fluid flow through the chamber; and a fluid control unit for injecting fluid into one of the first and second volumes.

36. The apparatus of claim 35 wherein the sealing baffle is pivotally connected to the chamber.

37. The apparatus of claim 35 including a plurality of sealing baffles pivotally connected to the chamber and selectively operable to form a seal between the product and the sidewall.

38. The apparatus of claim 35 including:

a frame structure for supporting a second tier of product above a first tier of product; and the movable sealing baffle extending from the chamber floor along the height of the first and second tiers of product.

39. The apparatus of claim 38 including:

a guide member attached to the frame structure for spacing the second tier of product apart from the sidewalls; and a second sealing member extending from the guide member over one side of the first tier of product.

* * * * *

UNITED STATES PATENT AND TRADEMARK OFFICE
CERTIFICATE OF CORRECTION

PATENT NO.    : 5,778,557

DATED         : July 14, 1998

INVENTOR(S)   : Leavens

It is certified that error appears in the above-identified patent and that said Letters Patent is hereby corrected as shown below:

| Col./Line | Error Reads | Should Read |
|---|---|---|
| 8/53 | claim 16 | claim 17 |
| 9/8 | claim 19 | claim 28 |

Signed and Sealed this

Eleventh Day of April, 2000

Attest:

Q. TODD DICKINSON

Attesting Officer

Director of Patents and Trademarks